United States Patent [19]

Chari

[11] 4,037,257
[45] July 19, 1977

[54] DATA CLOCK SEPARATOR WITH MISSING CLOCK DETECT

[75] Inventor: Srinivasan V. Chari, Foster City, Calif.

[73] Assignee: Xerox Corporation, Stamford, Conn.

[21] Appl. No.: 654,489

[22] Filed: Feb. 2, 1976

[51] Int. Cl.² ............................................. G11B 5/09
[52] U.S. Cl. ..................................................... 360/51
[58] Field of Search ............................. 360/39, 45, 51; 307/265, 293

[56] References Cited

U.S. PATENT DOCUMENTS

| | | | |
|---|---|---|---|
| 3,765,005 | 10/1973 | Cannon | 360/51 |
| 3,827,078 | 7/1974 | Bauer | 360/45 |
| 3,852,811 | 12/1974 | Aghazadeh | 360/51 |
| 3,887,942 | 6/1975 | Horowitz | 360/51 |
| 3,944,940 | 3/1976 | Desai | 360/51 |

*Primary Examiner*—Vincent P. Canney
*Attorney, Agent, or Firm*—M. J. Colitz, Jr.; T. J. Anderson; Barry Paul Smith

[57] ABSTRACT

Decoding apparatus for separating clock and data pulses from a double-frequency pulse train, including a retriggerable window one-shot, a bit shift compensation circuit, clock rate tracking means, data bit and clock bit gates, means for keeping track of whether a specific pulse is a data pulse or a clock pulse, and means for actuating the data bit and clock bit gates, based on the status of the system and the state of the window one-shot. The apparatus also provides means for detecting when a clock pulse is missing, including circuitry which simulates the detection of a clock pulse to the rest of the device to keep the system status and timing properly synchronized to the pulse train data.

20 Claims, 5 Drawing Figures

FIG_2

FIG_3

FIG_4

FIG_5

DATA CLOCK SEPARATOR WITH MISSING CLOCK DETECT

BACKGROUND OF THE INVENTION

1. Field of the Invention

This invention relates to data-clock separators for magnetic data storage devices, and more specifically to apparatus of that type having a missing clock detection feature used in conjunction with magnetic disc drives.

2. Description of the Prior Art

Data is commonly recorded on magnetic discs in the form of precisely timed flux reversals which, when processed through appropriate read-out circuits, produce a so-called double frequency pulse train in which data and clock information alternate. Data pulses may be present (logic 1) or absent (logic 0) in their assigned time slots, while clock pulses are normally always present as timing references for the data pulses. In magnetic disc drives, one common method for delineating between adjacent sectors on a given recording track is by not recording the normal clock pulse at that point on the track, i.e. by generating a "missing clock". A standard method for checking that clock pulses are not being confused for data pulses, i.e. that the data and clock pulses are in proper phase, is be recording a string of data "0" indications at the beginning of each sector of recorded information for clock identification purposes.

A timing problem arises in magnetic media due to the fact that each of the closely spaced flux variations in the magnetic medium tends to affect the adjacent one. As a result, the pulses of the double-frequency pulse train are shifted in time toward the assigned position of any adjacent absent pulse. Further, the recording and recovery may be performed on different disc storage devices, each having their own inherent speed tolerances, resulting in further clock timing variations.

In decoding a pulse train recovered from a disc, it is therefore necessary to perform the following operations:

1. determine which pulses are clock and which are data;
2. separate data pulses from clock pulses and convey both to external circuits;
3. detect missing clock pulses and provide an indication thereof to external circuits; and
4. simulate to the rest of the circuit the receipt of a clock pulse if a missing clock has been detected, to enable proper recognition of later data and clock pulses.

Apparatus for carrying out these functions has been known for some time. Typically, this type of apparatus either uses highly complex logic or contains several very precisely timed one-shots, or both. Due to the stringent tolerances which must be observed in order to make the circuit reasonably reliable in spite of shifts and inaccuracies in timing, each precision-timed one-shot must be manually adjusted after assembly by means of a trimming resistor. The resulting technician time is a significant economic detriment in the highly competitive disc drive market, and the multiple adustments can create further reliability and maintenance problems.

Bit sjift problems have been handled in the past by reducing the amount of data recorded during a given time interval space on the disc (i.e. lessening the data packing density) so that timing can be less exact upon read-out. Other solutions have included the use of complex error detection or parity circuits to detect when a bit of data has been missed as a result of bit shift. Clock rate variations have been rarely corrected for and have been handled by imposing tight tolerances on speed variations and write frequency.

SUMMARY OF THE INVENTION

The present invention provides a data-clock separation system using a minimum number of integrated circuits (six I.C.'s in the preferred embodiment) and only a few other components to perform clock and data detection and separation tasks, as well as missing clock recognition, on a pulse train. Also, only one one-shot is required to have a precise pulse width in the present invention so that only one technician resistor timing operation is required.

Accordingly, it is a principal object of this invention to provide a simple and inexpensive system for detecting, from an input pulse train, clock information, data information, and missing-clock information, and for outputting each of these separately.

Another object of this invention is to provide a system that requires only one one-shot to have an exact pulse width, thus minimizing the technician time required to make the circuit reliably operational.

Still another object of this invention is to provide a system that compensates in a simple and effective way for the shifting in time of the position of successive pulses (bits) in the pulse train.

A further object of this invention is to provide a system that not only detects when a clock pulse is missing from the pulse train and outputs a signal reflecting that this missing clock has been detected, but also uses the missing clock signal to simulate the detection of a clock pulse to the rest of the system so that the next pulse time interval is properly recognized as a data pulse interval.

BRIEF DESCRIPTION OF THE DRAWINGS

These and other objects and advantages of the present invention will become more apparent upon reference to the following description and accompanying drawings, in which.

DESCRIPTION OF AN ILLUSTRATIVE EMBODIMENT

I. General Operation.

Figure 2:
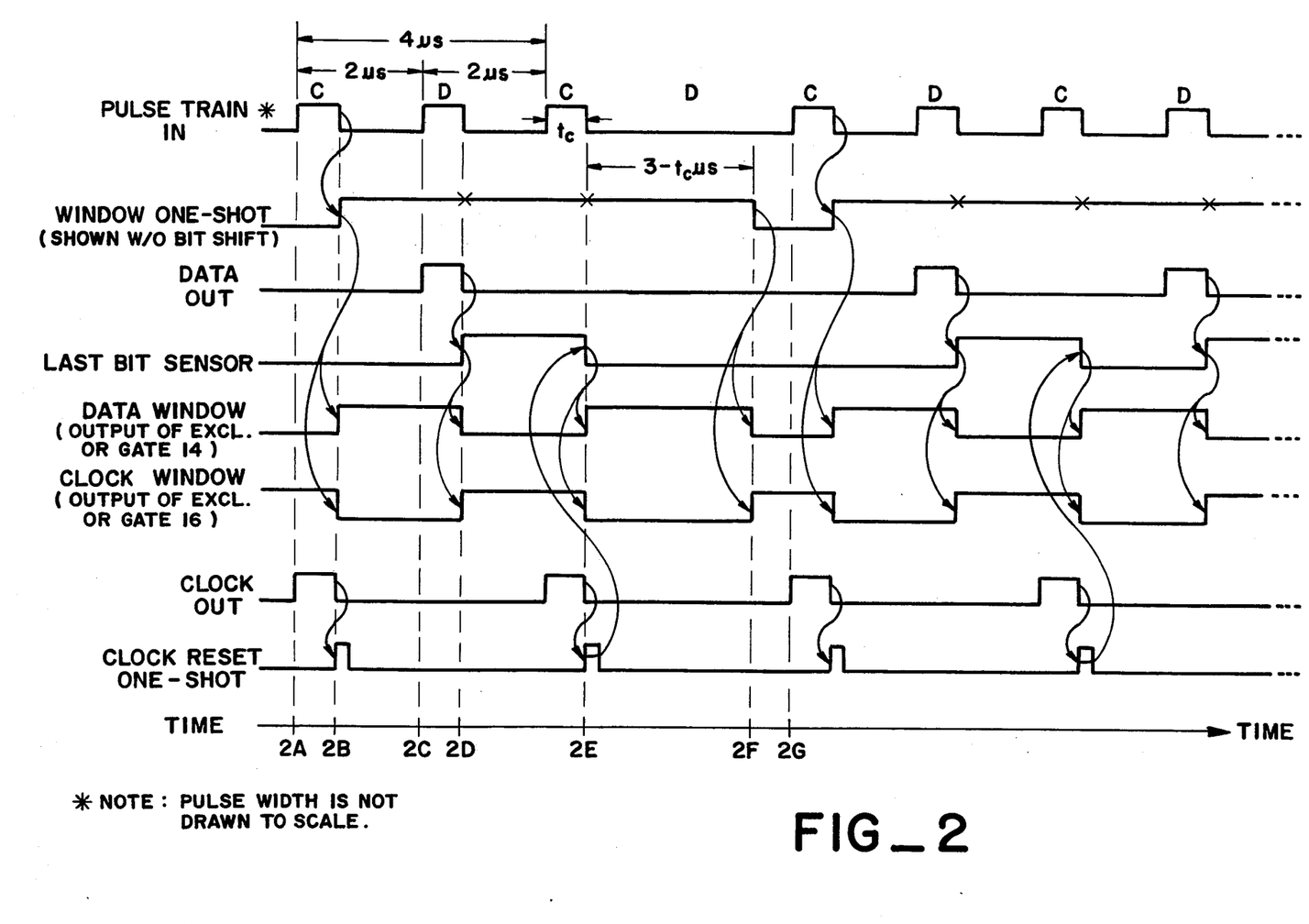
FIG. 2 is a timing diagram illustrating in general the operation of the circuitry of FIG. 1.

A typical digital pulse train in a form ready for signal analysis is illustrated in the timing diagram of FIG. 2. As can be seen, a clock pulse bit is normally interposed between each data time interval, whether a data pulse bit is present, e.g. a logic high or 1, or absent, e.g. a logic low or 0. In the present embodiment, the time interval between successive clock bits is set at $4\mu s$, as measured from the rising edge of the first clock bit to the rising edge of the next successive clock bit. The time interval from the rising edge of the clock bit to the rising edge of a data bit, when present in the next adjacent data time interval, is set at 2μs. Similarly, the time between the rising edge of a data bit to the rising edge of an adjacent next clock bit is also set at 2μs. Note that these time values are, however, affected by "jitter" and by other timing error effects, to be described in detail below.

Figure 1:
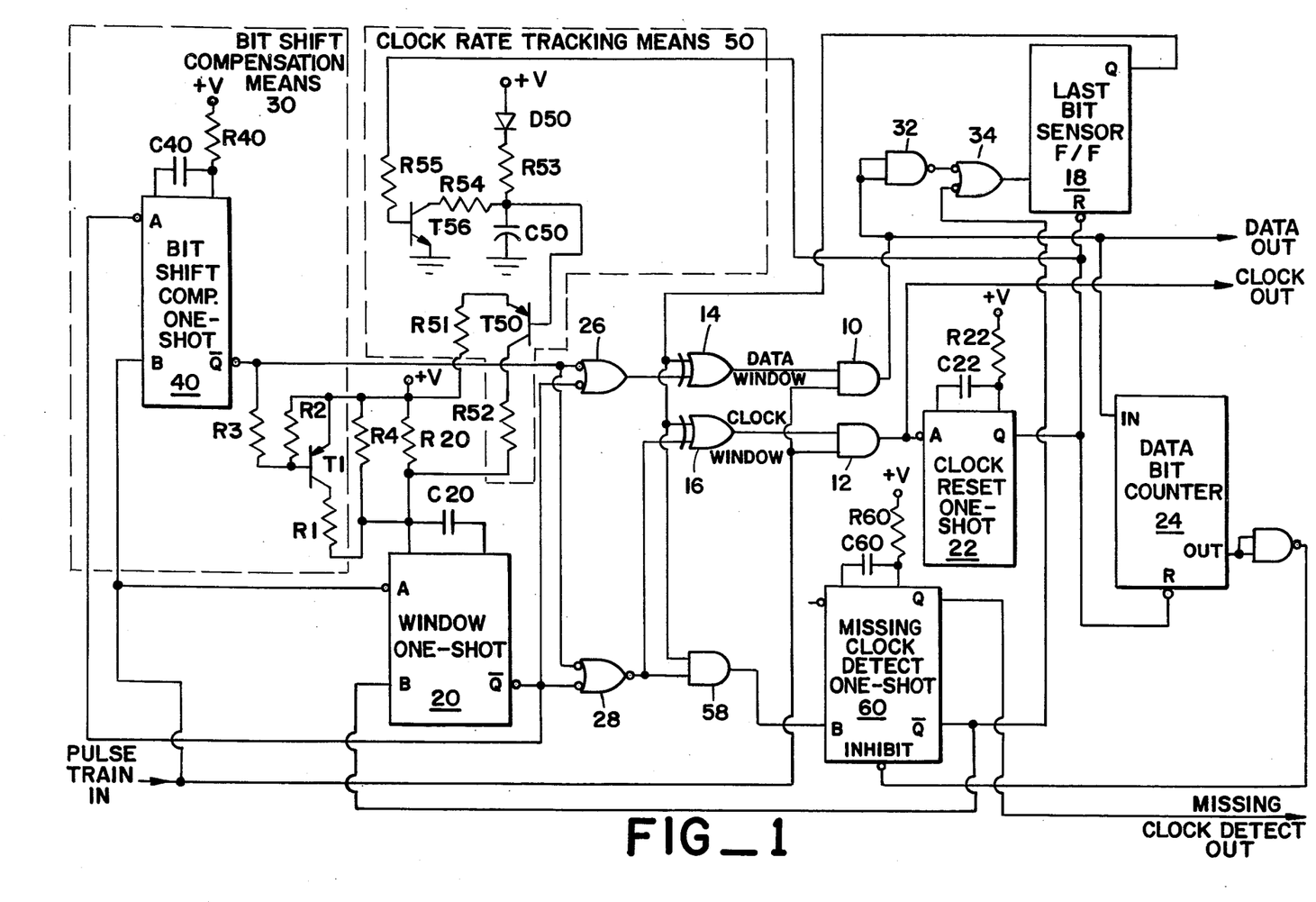
FIG. 1 illustrates a circuit schematic incorporating the present invention.

The present invention primarily acts to separate clock pulses detected on a pulse train from data pulses on the pulse train and to output separately this clock and data pulse (bit) information. The circuit schematic of FIG. 1 illustrates a preferred embodiment of the present invention.

The pulse train is inputted to two gates, a data bit gate 10 and a clock bit gate 12. These gates allow pulses on the pulse train to be outputted either as data or as clock pulses. That is, the gates 10, 12 perform the major switching function of the separator system in that separation of clock bits from data bits occurs here.

The means for controlling the data bit and clock bit gates 10, 12 includes a data window pulse, also called the data gate actuation interval, generated by an exclusive OR gate 14 and inputted to gate 10, and a clock window pulse, also called the clock gate actuation interval, generated by an exclusive OR gate 16 and inputted to gate 12. These window pulses control the time during which the gates 10, 12 are open to the passage of pulses from the pulse train. Only one of the gates 10, 12 is open at any given time.

The exclusive OR gates operate to create the above-mentioned data and clock window pulses in response to the present state of two components, the last bit sensor 18 and the window one-shot 20. The one-shot 20 can be a conventional circuit of the 74123 family of retriggerable one-shots. The last bit sensor 18 keeps track of whether or not a data bit was seen during the last time interval. The window one-shot 20 output is fed to the exclusive OR gate 14 via an inverting OR gate 26 and is fed to the exclusive OR gate 16 via a noninverting OR gate 28. Note that in operation, an exclusive OR gate only generates an output signal when the two inputs are at different states with respect to each other, e.g. one input at 1, the other at 0, or vice versa. The timing of window one-shot 20 is controlled or influenced by the RC network of timing resistors R20 and R4, and capacitor C20, by the bit shift compensation means 30, and by the clock rate tracking means 50. The means 30 and means 50 will be described in detail infra. It will be seen that the bit shift compensation means 30 acts to shorten the one-shot 20 pulse width, and the clock rate tracking means 50 acts to vary the pulse interval of the one-shot 20 as a function of the input pulse train pulse-to-pulse frequency. The present embodiment is designed such that the trimming resistor R4 is the only resistor whose value must be determined by the technician, i.e. only the timing of one-shot 20 is critical to the operation of the data-clock separator apparatus.

The pulses on the pulse train have a pulse width of 300 ± 75 ns. Since the time interval between successive clock pulses is set to vary around 4μs, the window one-shot 20 is timed to stay on an arbitrary 3μs from the rising edge of each pulse on the pulse train. This timing is chosen to maximize the number of correct pulse detections. Too short or too long a time and some pulses that have large timing error components may go unseen or be incorrectly recognized by the present apparatus. Thus, since one-shot 20 is triggered from the trailing edge of each pulse on the pulse train, the pulse width must be set such that $t_{pw} + t_c = 3\mu s$ where $t_c$ is the pulse width of pulses on the pulse train and $t_{pw}$ is the pulse width of the one-shot 20. Thus, the pulse width of the window one-shot 20 must be set to equal $3\mu s - t_c$. Where $t_c$ is 300 ns, $t_{pw}$ therefore becomes 2.7μs.

An illustration of the timing of the above circuitry is shown in FIG. 2 with the effect of the bit shift compensator circuit 30 and clock rate tracking means 50 initially omitted for clarity. Assuming that initially the last bit sensor 18 and the window one-shot 20 are off, when a pulse is detected on the pulse train at time 2A it is allowed to pass through the clock bit gate 12 and out on the CLOCK OUT line, since the clock window is presently in a 1 state, i.e. open. As can be seen in FIG. 1, this is because the exclusive OR gate 16 has a logic 1 at one input generated by the window one-shot being in an off state, and a logic 0 from the last bit sensor at its other input. Exclusive OR gate 14, however, has a 0 at both inputs since the output of the window one-shot 20 is coupled to this gate through a signal-inverting gate 26, so that the data window stays low.

Referring again to FIG. 2, when the trailing edge of the clock pulse is detected at time 2B, the circuit acts to close the clock window and open the data window. This result is caused by the window one-shot 20 getting triggered on by this pulse edge. The one-shot 20, in turn, causes the outputs of the two exclusive OR gates 14, 16 to reverse to thus open the data bit gate 10 and close the clock bit gate 12. The trailing edge of the outputted clock pulse (on the CLOCK OUT line) acts to trigger the clock reset one-shot 22. This one-shot 22 functions to reset the last bit sensor 18 and reset the data bit counter 24 (the function of the counter 24 will be described infra), and further functions to update the clock rate tracking means 50, described infra. Since the last bit sensor 18 is off at time 2B, the clock reset one-shot 22 pulse has no effect on it at this time. Note that the pulse width of the one-shot 22 is set by the resistor capacitor network R22, C22 to define a pulse width that is noncritical, since neither the reset pulse for the sensor 18 and counter 24, nor the clock rate tracking means 50 input pulse need to be precisely set.

During the window one-shot 20 window time, beginning at time 2B, the data window outputted from gate 14 is held open thereby so that if the data pulse is detected from the pulse train during this interval, it will pass through data bit gate 10 and out on the DATA OUT line. Again, as shown in FIG. 2, if such a data pulse is seen at a time 2C within $3 - t_c\mu s$ of the trailing edge of the previous clock pulse, it will be outputted on the DATA OUT line. The trailing edge of this data pulse, occurring at time 2D, also acts to trigger the window one-shot 20. Since the one-shot 20 is still turned on from the previous triggering, the data pulse acts to retrigger the one-shot 20 so that it continues to stay on for another $3 - t_c\mu s$ period, regardless of how far the prior one-shot 20 period had timed out.

The data pulse passed by gate 10, besides being outputted, is also coupled through inverter 32 and OR gate 34 to the input of the last bit sensor 18. The trailing edge of this data out pulse acts to change the state of the sensor 18 such that the output of sensor 18 changes from a 0 to a 1. Since this is one of the signals that is coupled to exclusive OR gates 14, 16, this change of state acts to turn off gate 14, i.e. close the data window, and turn on gate 16, i.e open the clock window. The circuit is now ready to recognize and pass the next pulse from the pulse train as a clock pulse.

Assuming that, as is normally the case, a clock pulse is detected before the window one-shot 20 has a chance to turn off, the trailing edge of this pulse, at time 2E, acts to retrigger the window one-shot 20 as the previous data pulse had done. Again, the clock out pulse trailing edge triggers the clock reset one-shot 22. Since now the last bit sensor 18 is on, due to the previous detection of a data pulse, the output of the clock reset one-shot 22 acts to reset the sensor 18. This causes the data window to open and the clock window to close since, as mentioned above, these windows are directly dependent on the present state of the last bit sensor and the window one-shot. The one-shot 22 (or a similar pulse generating circuit) is required since the reset input of both the sensor 18 and the data bit counter 24 needs to have inputted a 1 level at all times except during reset. Thus, as can be seen, the CLOCK OUT line could not perform this function while also allowing an entire clock pulse width to pass through the clock bit gate 12.

If, during the $3 - t_c\mu s$ time interval after the above clock pulse had triggered the window one-shot 20, no data pulse is detected, i.e. a data 0 is being read out, no pulse appears to retrigger the window one-shot 20. As a result, at time 2F, as shown in FIG. 2, the window one-shot times out and goes off. Again, this simply reverses the status of the data and clock windows, so that the next pulse sensed will be seen as a clock pulse and passed out by the clock bit gate 12. Note that the last bit sensor remains off at this time, since no data 1 was sensed. Thus, at time 2G, when the next clock pulse is seen by the circuit, the circuit responds as it did at time 2A, described above.

In summary one can see from the timing diagram of FIG. 2 that whenever a data 1 is sensed by the system the last bit sensor 18 goes on to thus reverse the state of the data and clock windows to allow clocking of the next pulse to be recognized as a clock pulse. When no data pulse is detected, the last bit sensor 18 stays off, but the window one-shot 20 makes the state change (turns off) to create the required reversal of the data and clock windows to again allow the next pulse to be recognized as a clock pulse. Note also that the window one-shot 20 is the only one-shot controlling data and clock window timing so that no other timing element in the system is required to be precisely timed. Thus, since close timing tolerances are not required, this circuit is correspondingly a more reliable system than prior art devices.

II. The Bit Shift Compensation Means

As can be seen in FIG. 1, a bit shift compensation one-shot 40 is the main element of the bit shift compensation means 30. The present invention does not require this one-shot 40 to be precisely timed. The one-shot 40 compensates for bit shift in two ways. First, it acts to shorten the window one-shot 20 "on-time" by approximately 10% when the one-shot 40 is actuated, i.e. from $3 - t_c\mu s$ down to $2.75 - t_c\mu s$. Secondly, the one-shot 40 protects the system from losing a portion of a detected pulse during an extreme bit shift condition, such loss occurring due to the premature turning off (time-out) of one-shot 20 before it is retriggered by the trailing edge of the detected pulse. Stated more generally, bit shift compensation is added to the system to improve the tolerance of the read-out system to variations in the timing of data on a given pulse train. It makes sure that an optimum time interval is provided for each next pulse on a given train, to give the pulse a much improved chance of being properly recognized by the system.

With regard to the first compensation function mentioned above, as shown in FIG. 1, the window one-shot 20 has its on-time interval varied by one-shot 40 by means of a resistor R1 of high resistance. R1 is electronically switched into a parallel-resistance relationship with trim resistor R4 and resistor R20 of the RC timing network of one-shot 20. Thus, in a unique way, the large resistor R1 functions to shorten the time constant and thus the on-time of the one-shot 20, under the control of a separately detected condition. The electronic switch is a conventional transistor T1 that is biased by resistors R2 and R3 so that the transistor turns on, i.e. looks like a short circuit between R1 and the +5 volt power supply when the bit shift compensation one-shot 40 is on. Note that since the entire on-time of the one-shot 40, as controlled by R40 and C40, only creates a 10% reduction in on-time of the one-shot 20, ten times greater error can be tolerated in the timing of the one-shot 40 than is allowed in one-shot 20. Thus, the one-shot 40 does not need to have a trim resistor added to it, and thus a technician operation is eliminated thereby.

The one-shot 40 is triggered by the rising edge of any pulse on the pulse train, if the window one-shot 20 is in an on state at that time. The one-shot 40 is inhibited by the window one-shot 20 if one-shot 20 is off. Thus, since the window one-shot 20 only stays on longer than the rising edge of the next pulse if a pulse existed to trigger it in the last time interval, the one-shot 40 acts to shoten the one-shot 20 time interval only when two pulses are detected successively in adjacent time intervals by the circuit.

Figure 3:
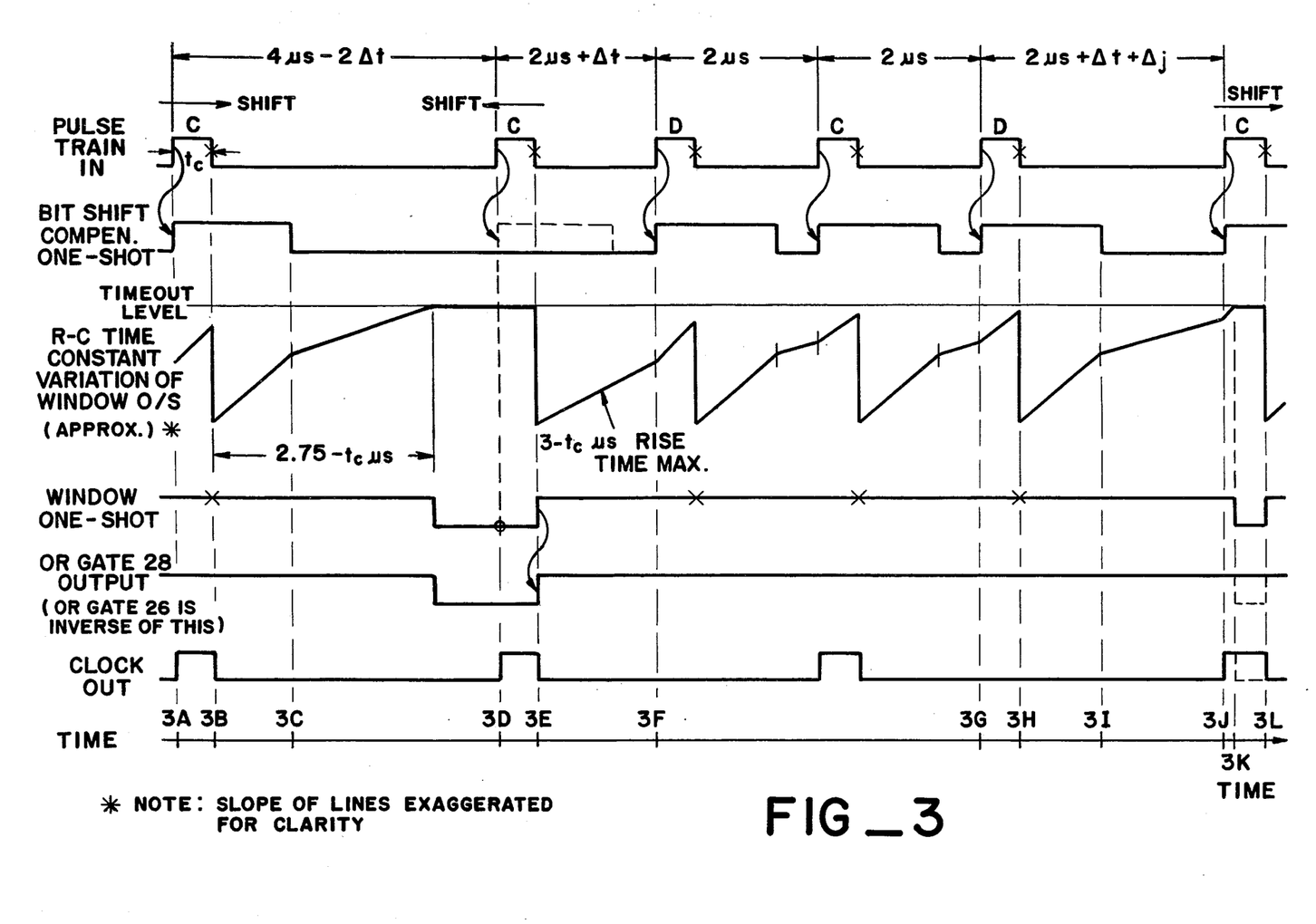
FIG. 3 is a timing diagram illustrating the operation of the bit shift compensation means of the current invention.

A timing diagram illustrating a pulse train having bit shift error components is given in FIG. 3. The diagram of FIG. 3 also shows how the compensation means 30 acts to compensate for this bit shift. The first bit shift component analyzed is bit shift caused by the magnetic properties of the recording medium. As mentioned previously, if the interval between two successive clock pulses contains a data 0, the clock pulses will appear to shift toward one another if there is a data 1 pulse on the opposite sides of these pulses. Thus, the time interval from time 3A to 3D will become $4\mu s - 2\Delta T$, where $\Delta T$ is the bit shift between two pulses caused when the two pulses exist at successive time intervals on the recording medium.

Referring first to time 3A, the indicated clock pulse (C) is shifted forward in time due to a prior data pulse (not shown). Thus, the time interval expected before a next adjacent data pulse will be shorter. To compensate for this bit shift, the bit shift one-shot 40 turns on when the second consecutive pulse is detected, e.g. at time 3A. At time 3B, when the window one-shot 20 gets retriggered, the bit shift one-shot 40, having switched the resistor R1 into the RC timing network of one-shot 20, causes the pulse width of one-shot 20 to shorten by 10% to approximately $2.75 - t_c\mu s$. One can see from the RC time constant variation curve shown that window one-shot 20 has a steeper time constant slope from time 3B to time 3C, until one-shot 40 turns off. When one-shot 40 goes off, resistor R1 no longer appears in the one-shot 20 RC timing network, so that the time constant of the RC network reverts thereby back to normal. Since no data pulse is detected in this time interval, the window one-shot 20 turns off after $2.75 - t_c\mu s$.

The next clock pulse shown in the pulse train of FIG. 3 at time 3D has a bit shift that is shifted away from a next data pulse. This results from the occurrence of no pulse in the prior interval coupled with a pulse existing in the next adjacent time interval. Since this creates a longer expected time interval between the clock and the next data pulse, the bit shift one-shot 40 is caused to remain off to enable a full window one-shot 20 time interval to occur. Thus, at time 3D, since the one-shot 20 is off, indicating that no pulse was detected in the pulse train in the prior time interval, the one-shot 20 inhibits the triggering of one-shot 40 so that it remains off. The dotted line indicates when the one-shot 40 pulse would have occurred had it not been inhibited. As a result, one can see from the RC time constant variation curve of one-shot 20 that when one-shot 20 is triggered at time 3E, the slope of its time constant stays at $3 - t_c \mu s$ rise time until the next data pulse is detected.

Note that the system always allows the longer time interval to occur when a prior time interval did not contain a pulse. This is because the longer time interval is needed to make sure a subsequent pulse is within the window, if a pulse is in fact present at that time. If a pulse is not on the pulse train in the next interval, e.g. a data 0 is present, so that no bit shift actually has been created by the medium and thus does not exist to be compensated for, the fact that the longer pulse width of $3 - t_c \mu s$ is produced does not adversely effect the later detection of the next following clock pulse. This is because the next clock pulse occurs at a time relatively long after the time-out of even a $3 - t_c \mu s$ data window pulse width (normal time between clock pulses, shown in FIG. 2, is set at $4\mu s$).

A further characteristic of the circuit is that the time constant of the RC timing network of one-shot 20 is speeded up if and when a next data pulse finally is detected at time 3F. This is caused by the bit shift one-shot 40 going on upon being triggered by the rising edge of this next pulse. As explained hereinbelow, the one-shot 40 is designed to be triggered on by the rising edge of a pulse on the pulse train. It functions to eliminate any danger of the one-shot 20 timing out and going off during the data-through of this next pulse out of the system. Thus, the fact that the pulse width of one-shot 20 is decreased slightly by one-shot 40, beginning when one-shot 40 goes on, has no significant effect on the circuit.

Time interval 3G to 3J in FIG. 3 illustrates the operation of the circuit if the one-shot 20 goes off prematurely during the next detected pulse. This might occur as a result of a maximum of bit shift and to a much lesser extent also as a result of the change in the one-shot 20 pulse width in response to the turning on of one-shot 40, as mentioned above.

Assuming a bit shift of $\Delta T$ due to the effect of the magnetic recording medium and an added shift $\Delta J$ due to RPM variations of the storage medium in the interval 3G to 3J, one can see that the next pulse, a clock pulse in the present example, appears at time 3J, just before the window one-shot 20 goes off. Such a late arrival of this pulse would indicate that the pulse was shifted by the RPM and medium error conditions by as much as $1\mu s$ away from where it should have appeared. Without further error compensation, the clock out pulse, as indicated by the dotted line shown, would be cut off at time 3K when one-shot 20 goes off. However, the two output OR gates 26, 28f preclude this result.

Output OR gate 28 functions to extend the clock window by OR'ing together the outputs of one-shot 20 and one-shot 40, so that if one-shot 20 goes off prematurely, i.e. before the clock pulse has an opportunity to retrigger one-shot 20, one-shot 40 takes over as the clock window generator. As stated above, this result is possible since one-shot 40 is triggered by the rising edge of each pulse. OR gate 26 operates similarly to maintain the data window in an open condition if one-shot 20 goes off prematurely during a data pulse.

III. The Missing Clock Detect Means

As mentioned above, the missing clock detect means first has the function of recognizing that a given clock pulse is missing from the pulse train and then outputting this detected condition. Secondly, the means acts in response to the detection of a missing clock to simulate to the rest of the system the receipt of the clock pulse, so that the next time interval is correctly recognized by the system to be a data pulse time interval.

Referring to FIG. 1, the output of the last bit sensor 18 is AND'ed, by AND gate 58, with the output of OR gate 28. This gate 58, therefore, outputs a pulse only when the last bit sensor is on, indicating that a data pulse had been read-out during the last time interval, in conjunction with when the window one-shot 20 goes off, indicating that an expected clock pulse has not appeared on the pulse train to retrigger this one-shot 20. The rising edge of the output of gate 58 immediately triggers the missing clock detect one-shot 60, the output of which is the missing clock detect pulse, and this signal is outputted from the system on the MISSING CLOCK DETECT OUT line. Timing for one-shot 60 is controlled by the R60, C60 timing network.

Besides indicating the occurrence of a missing clock, as above, the missing clock detect pulse next functions to simulate the receipt of a clock pulse to the system. Since each clock pulse must reset the last bit sensor 18, the one-shot 60, as it turns off, acts via the trailing edge of the missing clock detect pulse to simulate this function by clocking the sensor 18 through OR gate 34. Since the sensor 18 is a two state counter or flip-flop, this causes the sensor 18 to reset to a 0 state. Note that an OR gate 34 allows the coupling of either data pulses or the missing clock pulses to the clock input line of the sensor 18. The missing clock detect also is fed back to window one-shot 20 to trigger it on, to enable the data window to be open rather than the clock window. Thus, these windows now reflect the states that would have resulted had an actual clock been detected.

Figure 4:
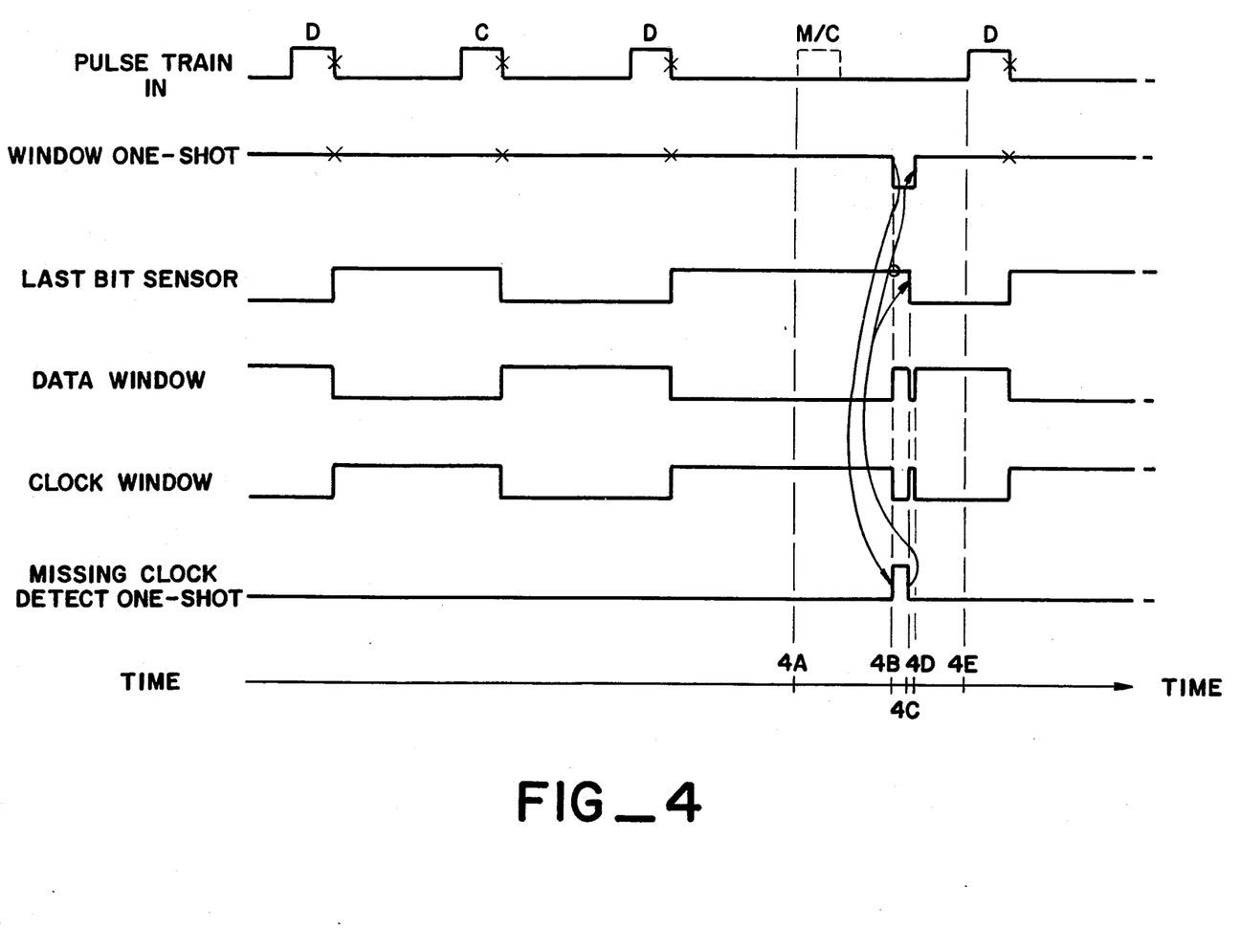
FIG. 4 is a timing diagram illustrating the operation of the missing clock detect means of the current invention.

Referring to the timing diagram of FIG. 4, one can see that time 4A marks where the clock normally would have appeared. Time 4B is when the window one-shot 20 goes off, having not been retriggered by a successive clock pulse. One requirement for the use of the missing clock as a sector delineator in the preferred embodiment is that there must have been a data "1" in the previous data time interval. Otherwise, the last bit sensor 18 would not be in the proper state for error-free missing clock detection.

At time 4B, the missing clock detect one-shot 60 is triggered. When the one-shot 60 goes off at time 4C, it causes the last bit sensor 18 to reset. At this time the data and clock windows reverse state for a very short time until the window one-shot turns on at time 4D. This occurrence, a "race condition" resulting from the slower turn-on time of one-shot 20, does not effect the operation of the system since no pulses from the pulse train at that time are being passed through either the clock bit gate 10 or the data bit gate 12, the gates that are affected by window state changes. Thus, by the time 4E, when a next data pulse appears, the window one-shot 20 and both the clock and data windows are in the proper state to recognize this pulse correctly as a data pulse. Note that since the pulse width of the missing clock one-shot 60 is short with respect to the time interval before the next data interval, e.g. 200 ns as compared to 1 μs, again the accuracy of the one-shot 60 pulse width is not critical. Thus, again, no special technician timing operations need be performed to get this circuit operating reliably.

IV. Clock Rate Tracking Means

The clock rate tracking means is shown at 50 in FIG. 1. This circuit is designed to compensate for variations in the clock rate of the inputted pulse train to thereby improve the margins for successful data-clock separation. Essentially, the circuit senses the average time period between clock pulse occurrences and adjusts accordingly the timing of the window one-shot 20. The present invention is designed to be able to withstand at least a 6% variation in clock-to-clock timing, e.g. a range of 4 microseconds ± 250 ns. Note that this range is unaffected by any timing variation adjustments made by the bit shift compensation means 30. To insure a maximum degree of clock rate correction, the clock rate tracking means is designed to detect and adjust for variations of clock periods up to ± 1 microsecond, or four times the 6% maximum range variation expected. Further, the means 50 does not require the addition of any technician resistor trimming step, since the trim resistor R4 also is chosen to match any undesirable D.C. effects that the means 50 may have on the RC timing network of window one-shot 20.

Referring again to FIG. 1, the means 50 basically comprises a capacitor C50 whose charged state controls a current source that is coupled to the RC network R20, C20 of the window one-shot 20. The capacitor C50 charges through diodes D50 and resistor R53, and discharges through resistor R54 when transistor T56 is turned on. T56 is conventionally biased by resistor R55 so that it acts as an electronic switch for switching R54 to ground. The clock reset one-shot 22 was chosen to control the switching on of T56 since one-shot 22 is triggered after every detected clock pulse, and its pulse width is not critical in terms of its functioning as the reset pulse for sensor 18 and counter 24. The only limitation is that the two units 18 and 24 not be held in a reset state beyond the time when the next data pulse comes through. Otherwise, this data pulse will not be properly recognized. However, sensitivity of the means 50 requires that the one-time $t$ of reset one-shot 22 be the maximum possible. This is because if $t$ is say 40 ns, one-shot 22 is on for only 1% of the clock period of 4 microseconds. This short a time would allow C50 to discharge only a small amount. The other 99% of the time, C50 would be charging. Such a large charge/discharge time disparity would not be very useful. On the other hand, a time of 50% of the clock period is the optimum time desired since the charging and discharging times for C50 would then be equal, since, if the charging time of C50 is $t_2$, $t+t_2$ must equal the clock period. In the present invention, one microsecond was arbitrarily chosen as the maximum value possible considering the timing limitations of the reset functions of the one-shot 22.

In operation, as the capacitor C50 charges up, it produces an increasing voltage at the base of transistor T50. This voltage, in conjunction with resistor R51, controls the collector current of T50. This collector current is coupled to capacitor C20 of window one-shot 20 and contributes to the charging current of C20. Thus, the larger the collector current, the faster C20 charges, and, as a result, the sooner the window one-shot 20 times out and goes off. In other words, if the detected input clock rate is faster, it causes the capacitor to discharge more, causing the base voltage of T50 to go down. This causes the collector current of T50 to go up, thus charging C20 faster and thereby lessening the period of the window one-shot 20. R52 sets the maximum T50 collector current that is generatable and thereby the minimum on-time for the window one-shot 20. The maximum on-time for the window one-shot 20 corresponds to a T50 collector current of zero. Therefore, the clock rate tracking means 50 operates to enable the timing of the window one-shot 20 to follow the detected clock rate. Note that here transistor T50 is being used not as a digital switch having only an "on" and an "off" state, but as an analog switch having a range of possible states, i.e. a transistor biased to operate in its active region, allowing thereby its output collector current to vary anywhere between zero and its designed maximum amperage.

The capacitor C50 is designed to charge and discharge at a rate that is over 50 times slower than that of the normal clock period. This is to insure that clock rate variations that are not average are not seen by the tracking means 50. Thus, a missing clock, see supra, has almost no affect on the charged state of C50. Only a string of clock pulses having a longer or shorter period will have an affect on the means 50. Thus, the capacitor C50 functions in an analogous way to a variable frequency oscillator (VFO), a much more complex method used in the past to perform the clock rate tracking function. Using VFO terminology, a "capture range" is created by the capacitor of the present invention, wherein a window period that is variable between a maximum and minimum time is generated to enable a more successful recognition or capture of clock pulses by the system.

Diode D50 is added for two reasons. First, it provides circuit temperature compensation in that the voltage drop across D50 tracks the emitter-base voltage drop across transistor T50. Secondly, the voltage drop across the diode D50 makes sure that the capacitor C50 cannot charge up to a full supply voltage level of 5 volts. Thus, it keeps the base voltage of T50 at a point where it is closer to the transistor T50 active range, i.e. it ensures that T50 is partially conducting at all times.

Figure 5:
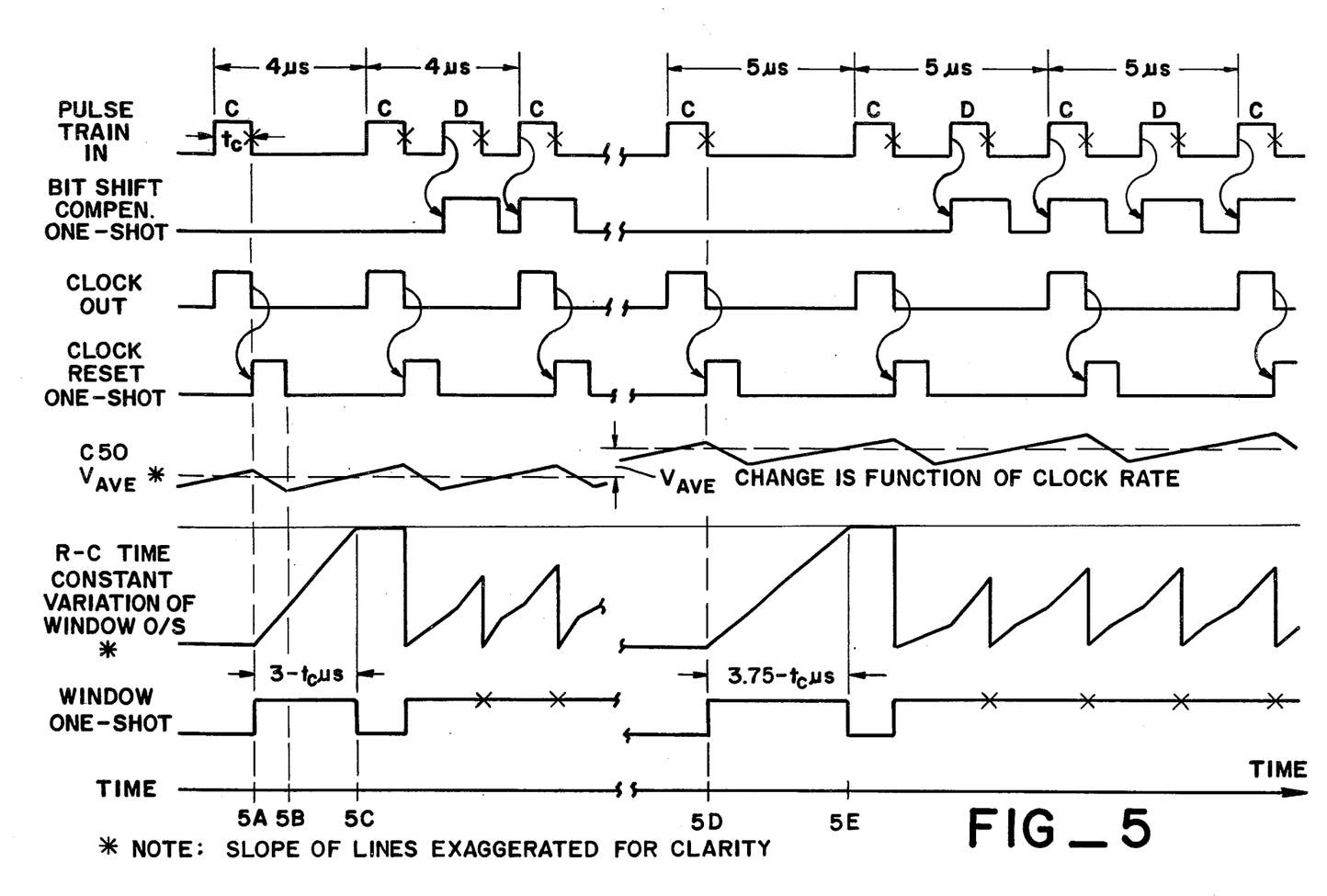
FIG. 5 is a timing diagram illustrating the operation of the clock rate tracking means of the current invention.

FIG. 5 illustrates how the clock rate tracking means 50 affects the timing of the window one-shot 20. The timing diagram is divided in half, the left half illustrating the normal operation of the present invention, and the right half illustrating the operation of the present invention with a maximum input clock period of 5 microseconds. Of special interest is the line representing the average voltage, $V_{ave}$ of C50. As can be seen, due to the fact that the clock reset one-shot 22 can only be on for a maximum of one microsecond out of the average clock-to-clock period of 4 microseconds, the discharge time, i.e. the time when the reset one-shot 22 is on, must enable the capacitor C50 to discharge at four times the rate of the capacitor charging time. Adjusting in a conventional way the values of R53 and R54 enables this result. Further, when the clock-to-clock period is 5 microseconds, one can see that the $V_{ave}$ of C50 is now at a higher value than when the clock-to-clock period is 4 microseconds.

Referring again to the left half of the timing diagram, one can see that between time 5A and 5C, the collector current of T50 is biased such that the window one-shot 20 times out and goes off after $3-t_c$ microseconds. Note that between times 5A and 5B the clock reset one-shot 22 is on, causing C50 to discharge. Since the timing of the charge/discharge rate of C50 is set to be longer than 50 times the 4 microsecond period normally occuring between clocks, this specific discharge has a negligible affect on the timing of the one-shot 20.

The right half of FIG. 5 illustrates the timing that would result after a 5 microsecond clock-to-clock period had been experienced for some plurality of clock pulses such that the $V_{ave}$ of C50 has increased as shown. Thus, between times 5D and 5E is illustrated the maximum allowed pulse width time of the window one-shots, e.g. $3.75 - t_c$ microseconds. Consequently, for all average values of clock period in the range of $4 \pm 1$ microseconds, the clock rate tracking means 50 enables the window one-shot 20 to follow the clock rate variation with a pulse width that retains the same ratio relationship of 75% that is set for it when the clock period is 4 microseconds. That is, the normal timing is set such that window one-shot 20 stays on for 3 microseconds after the rising edge of the previous pulse train pulse, thus defining a ratio between the two of $3\mu s/4\mu s = 75\%$. Thus, at a 5 microsecond clock period, the window one-shot 20 timing becomes $5\mu s \times .75 = 3.75\mu s$, or a pulse width of $3.75 - t_c/\mu s$, as given above.

V. The Phase Detect Means

The final aspect of the data-clock separation system that is to be discussed is the means for recognizing whether a given pulse is a clock pulse or a data pulse, i.e. the phase detect means. In the case of disc memory systems, phase detection is initiated whenever a new track is accessed for read-out. Phase may also be checked once every sector on a given track. In the present invention, the phase checking involves the use of a string of four clock pulses with data zeros in alternating time intervals, such phases being recorded on each track in positions as desired. Thus, if the system is out of phase, i.e. recognizing data bits as clock bits, and vice versa, when a phase checking string is read, the system will see erroneously a series of four data bits without intervening clock bits. Note that more than one missing clock bit is required to be seen before phase reversal is initiated so that the missing clock detect means, described supra, does not itself create phase reversal.

As shown in FIG. 1, the phase detect means operates simply by counting, in a data bit counter 24, all data "1"'s that are outputted by the system. To keep from having a phase reversal when the system is properly in phase, each clock pulse acts to reset the counter 24 and the last bit counter 18 by means of the clock reset one-shot 22. Note that the missing clock detect one-shot 60 does not reset the counter 24. This is because with phase reversed, all clock pulses are read as data pulses, so that the missing clock detect one-shot 60 will detect missing clocks whenever a data 0 occurs, including during the phase checking sting. To allow it to reset the counter 24 would thus defeat the counter's action.

Thus, if counter 24 reaches the count of four without being reset by a clock pulse, it knows that the phase is improper. As a result, it outputs a pulse level indicating this condition. This pulse level is fed to the inhibit output of the missing clock detect one-shot 60, so that when the window one-shot 20 turns off, due to the next "missing clock", one-shot 60 is not allowed to respond thereto with another clock simulation operation. That is, the one-shot 60 is blocked from resetting the last bit sensor and retriggering the one-shot 20. Thus, the next pulse inputted to the system is forced by the counter 24 to be seen as a clock pulse, since with the sensor 18 still on, the clock window is open rather than the data window. Once this clock pulse is properly recognized by the system, i.e., it passes through the clock bit gate 12, as enabled by the clock window pulse, this clock pulse completes the phasing reversal by resetting the data bit counter 24 and the last bit sensor 18 by means of one-shot 22. The resulting status of the system is now in the correct state for subsequent in-phase data read-out, as exemplified in FIG. 2.

What is claimed is:

1. A method for varying the on-time of an electronic window one-shot that is triggered by pulses on an input pulse train to thereby generate timed output pulses, wherein the normal output pulse width of said one-shot is set by a predetermined value of resistance and capacitance in an RC network connected to said one-shot, said method comprising the steps of:
   a. detecting a condition for which a different pulse width is desired;
   b. triggering a second one-shot, in response to the detected condition, to generate a second timed pulse;
   c. activating an electronic switch in response to the second pulse; and
   d. using said switch to charge the time constant value of the timing network of said window one-shot to thereby change the output pulse width of said window one-shot.

2. A method for varying the on-time of an electronic window one-shot that is triggered by pulses on an input pulse train to thereby generate timed output pulses, wherein the normal output pulse width of said one-shot is set by a predetermined value of resistance and capacitance in an RC network connected to said one-shot, said method comprising the steps of:
   a. detecting a condition for which a different pulse width is desired;
   b. triggering a second one-shot, in response to the detected condition, to generate a second timed pulse;
   c. activating an electronic switch in response to the second pulse; and
   d. using said switch to change the time constant value of the timing network of said window one-shot to thereby change the output pulse width of said window one-shot, wherein the detected condition called for in step (a) comprises the detection by the second one-shot of the rising edge of a pulse on said pulse train at a time within the pulse width interval of said window one-shot.

3. A method for varying the on-time of an electronic window one-shot that is triggered by pulses on an input pulse train to thereby generate timed output pulses, wherein the normal output pulse width of said one-shot is set by a predetermined value of resistance and capacitance in an RC network connected to said one-shot, said method comprising the steps of:
   a. detecting a condition for which a different pulse width is desired;
   b. triggering a second one-shot, in response to the detected condition, to generate a second timed pulse;
   c. activating an electronic switch in response to the second pulse; and
   d. using said switch to change the time constant value of the timing network of said window one-shot to thereby change the output pulse width of said window one-shot, wherein the change to the timing network called for in step (d) comprises the addition of resistance in parallel across the normal resistance of the timing network of said window one-shot to thereby shorten the time constant of said timing network and thus shorten the output pulse width of said window one-shot, and wherein said change to said timing network is small enough that the accuracy of the window one-shot pulse width when shortened is not substantially impaired by a substantial pulse width inaccuracy in the second one-shot pulse.

4. A method for varying the on-time of an electronic window one-shot that is triggered by pulses on an input pulse train to thereby generate time output pulses, wherein the normal output pulse width of said one-shot is set by a predetermined value of resistance and capacitance in an RC network connected to said one-shot, said method comprising the steps of:
   a. detecting a condition for which a different pulse width is desired;
   b. triggering a second one-shot, in response to the detected condition, to generate a second timed pulse;
   c. activating an electronic switch in response to the second pulse; and
   d. using said switch to change the time constant value of the timing network of said window one-shot to thereby change the output pulse width of said window one-shot, said method being applied to pulse trains containing alternating clock pulses and data pulses and further comprising the steps of:
   e. detecting the period of the clock pulses included on said input pulse train;
   f. controlling the charged state of a capacitor in response thereto, via charging and discharging means, such charging and discharging of said capacitor being slow enough that it reflects only average changes in clock period; and
   g. varying the time constant of said window one-shot as a function of the charged state of said capacitor to thereby enable the output pulse width of said window one-shot to follow the variations in the period of said clock pulses.

5. The method of claim 4, wherein the time constant varying called for in step (g) comprises the application of current to the timing network of said window one-shot as a function of the charged state of said capacitor.

6. A signal analysis system wherein data signals are separated from clock signals in a received pulse train having pulse intervals alternately containing clock and data information, said system comprising:
   a window one-shot arranged to be triggered or retriggered to generate a time interval whenever either a data bit or a clock bit is presented to the system;
   an RC timing network for setting the duration of said time interval, said network including a trim resistor for precisely setting said duration;
   status means for indicating whether the last bit detected was a data bit or a clock bit;
   clock output means including a clock bit gate;
   data output means including a data bit gate; and
   means responsive to said window one-shot and said status means for generating a timed data bit gate actuation interval or a timed clock bit gate actuation interval for enabling the next bit detected on the received pulse train to be selectively coupled through either the clock bit gate or the data bit gate.

7. The signal analysis system of claim 6, further comprising bit shift compensation means for detecting the occurrence of a successive data or block bit in a time interval after an adjacent previous time interval that contained a clock or data bit, and for acting thereon to shorten the next time interval by decreasing the precisely set interval duration of said window one-shot by an amount small in comparison to the said duration, said bit shift compensation means comprising:
   a second one-shot having as one input the output of said window one-shot and as the other input the raw pulse train;
   an electronic switch actuated by said second one-shot; and
   a resistor coupled to the electronic switch such that when said switch is actuated by a second one-shot, the resistor is thereby added in parallel to the resistor of the RC timing network of said window one-shot to thereby shorten the time constant of this timing network and thus shorten the said interval duration.

8. The signal analysis system of claim 7 further comprising second bit shift compensation means comprising logical OR'ing means that OR the output of said window one-shot with the output of said second one-shot, to prevent the said data bit or said clock bit gate from closing due to a premature time-out of said window one-shot before a given clock or data bit has passed completely therethrough.

9. The bit shift compensation means of claim 8 wherein said electronic switch comprises a transistor switch.

10. The signal analysis system of claim 6 further comprising clock rate tracking means for varying the time interval of said window one-shot as a function of the average period of detected clock signals, said means comprising:
   pulse generation means for generating a pulse of a set pulse width in response to each detected clock signal;
   electronic switch means;
   capacitor means;
   means for normally changing the electrical charge on said capacitor means at a constant rate; and
   voltage-controlled current source means actuated as a function of the charge of said capacitor means, for coupling a current to the RC timing network of said window one-shot, said generated pulse actuating said electronic switch means to switchably counteract said means for changing the charge on said capacitor to enable the said capacitor means charge to thereby obtain a relatively constant value reflecting the average clock period.

11. The signal analysis system of claim 10 wherein the voltage-controlled current source means comprises a transistor biased to function in its active region.

12. The signal analysis system of claim 11 wherein the means for changing the charge on said capacitor means is a resistor coupled through a diode to a supply voltage such that said capacitor is charged thereby at a constant rate, except when said electronic switch is actuated, during which time said capacitor means discharges through said switch.

13. The signal analysis system of claim 6 wherein said status means comprises a 1st bit sensor that is normally set when a data bit has been coupled through the data bit gate and is normally reset when the next immediately-following clock bit is coupled through the clock bit gate.

14. The signal analysis system of claim 13 wherein said means responsive to said window one-shot and said status means comprises two exclusive OR logic gates wherein said last bit sensor inputs to one input of each of said gates and said window one-shot inputs its normal output to the first gate for creation of said clock bit gate actuation interval and its inverted output to the second gate for creation of said data bit gate actuation interval.

15. The signal analysis system of claim 14 wherein said status means further comprises phase detect means for differentiating between clock pulses and data pulses, said detector comprising:
- means for counting a plurality of data counts, said means being enabled only if no intervening clock counts are detected by the system, and being engaged to output a pulse when a specific count has been reached; and
- means for inhibiting the resetting of the last bit sensor when said specific count has been reached, so that said clock bit gate actuation interval, as inputted to said clock bit gate, remains active through the next time interval to allow the next pulse on the pulse train to be detected as a clock pulse rather than a data pulse.

16. The signal analysis system of claim 15 further comprising missing clock detect means, said means comprising:
- a missing clock one-shot;
- means for triggering said missing clock one-spot upon the concurrent occurrence of the indication by said last bit sensor that said last bit sensor has detected a data pulse and the timing out of said window one-shot; and
- means for outputting a signal reflecting the triggered state of said missing one-shot, wherein said means further acts to artifically emulate the reception of said last bit sensor of a clock bit, and acts to artifically trigger the said window one-shot to emulate the reception of a clock pulse.

17. A method for detecting a missing clock pulse in a signal wherein the signal is a pulse train having each clock bit interval alternating with a data bit interval, said method comprising the steps of:
- a. inputting the pulse train to a window one-shot whose output is a precisely set pulse width;
- b. keeping track of the status of the pulse train data, including whether the last bit detected was a data bit or a clock bit;
- c. comparing the status with said window one-shot to generate either a data or a clock gate time interval thereby;
- d. passing either the clock information or the data information through gates actuated respectively by said data or clock gate time intervals;
- e. detecting when a clock bit is missing during a given clock gate time interval;
- f. outputting this detected missing clock state, when detected; and
- g. simulating to said status means and said window one-shot the receipt of a clock bit so that the next interval is recognized properly as a data gate time interval.

18. The method of claim 17 wherein step (e) comprises the steps of:
- a. detecting from the status indicator that the last bit selected was a data bit;
- b. detecting the going-off of the window one-shot prior to the detection of a clock bit by the status indicator; and
- c. setting a missing clock one-shot in response thereto.

19. The method of claim 18 wherein step (g) comprises the steps of:
- a. resetting the status indicator by means of the missing clock one-shot such that said status indicator no longer indicates that the last bit detected was a data bit; and
- b. triggering the window one-shot by means of said missing clock one-shot to put said window one-shot in the state it would have been in had a clock pulse been detected by said window one-shot.

20. A signal analysis system wherein data signals are separated from clock signals in a received pulse train having pulse intervals alternatively containing clock and data information, said system comprising:
- a window one-shot arranged to be triggered or retriggered to generate a time interval whenever either a data pulse or a clock pulse is presented to the system;
- an RC timing network for setting the duration of said time interval, said network including a trim resistor for precisely setting said duration;
- status means for indicating whether the last pulse detected was a data pulse or a clock pulse;
- clock output means including a clock bit gate;
- data output means including a data bit gate;
- means responsive to said window one-shot and said status means for generating a timed data bit gate actuation interval or a timed clock bit gate actuation interval for enabling the next pulse detected on the received pulse train to be selectively coupled through either the clock bit gate or the data bit gate;
- bit shift compensation means for detecting successive pulses on the received pulse train and for shortening the time interval generated by said window one-shot in response thereto comprising means for switchably coupling a signal to said RC timing network for shortening thereby said network time constant; and
- clock rate tracking means for varying the time interval of said window one-shot as a function of the average period of clock pulses detected by said clock output means comprising a capacitor, means for controlling the charge on said capacitor as a function of said clock pulse period, and voltage-controlled current source means actuated as a function of the charge of said capacitor means, for coupling a current to said RC timing network of said window one-shot.

* * * * *